United States Patent
Lester et al.

(10) Patent No.: US 10,312,855 B2
(45) Date of Patent: Jun. 4, 2019

(54) BRACKET MOUNT FOR SECURING MICRO-INVERTERS AND POWER OPTIMIZERS TO SOLAR PANEL ARRAYS

(71) Applicant: Ironridge, Inc., Hayward, CA (US)

(72) Inventors: Bryan Lester, Phoenix, AZ (US); William Pereira, Phoenix, AZ (US); Shawn Meine, Phoenix, AZ (US)

(73) Assignee: IronRidge, Inc., Hayward, CA (US)

( * ) Notice: Subject to any disclaimer, the term of this patent is extended or adjusted under 35 U.S.C. 154(b) by 0 days.

(21) Appl. No.: 15/610,403

(22) Filed: May 31, 2017

(65) Prior Publication Data
US 2017/0346441 A1 Nov. 30, 2017

Related U.S. Application Data

(60) Provisional application No. 62/343,807, filed on May 31, 2016.

(51) Int. Cl.
| | |
|---|---|
| *H02S 40/34* | (2014.01) |
| *H02S 40/32* | (2014.01) |
| *G05F 1/67* | (2006.01) |
| *H02M 7/00* | (2006.01) |
| *H02S 30/00* | (2014.01) |
| *F16B 1/00* | (2006.01) |
| *F16B 3/00* | (2006.01) |
| *F16B 5/06* | (2006.01) |

(52) U.S. Cl.
CPC ............... *H02S 40/34* (2014.12); *G05F 1/67* (2013.01); *H02M 7/003* (2013.01); *H02S 30/00* (2013.01); *H02S 40/32* (2014.12); *F16B 3/00* (2013.01); *F16B 5/0642* (2013.01); *F16B 2001/0064* (2013.01)

(58) Field of Classification Search
CPC .......... H02S 30/10; H02S 30/32; H02S 40/34; H02M 7/003; F16M 13/02; G05F 1/67; F16B 5/0642; F16B 3/00; F16B 2001/0064
USPC ...................... 361/679.01, 809; 136/244, 251
See application file for complete search history.

(56) References Cited

U.S. PATENT DOCUMENTS

| | | | |
|---|---|---|---|
| 8,070,404 B1 * | 12/2011 | Schluter ............... | F16B 39/282 |
| | | | 411/368 |
| 8,752,338 B2 | 6/2014 | Schaefer et al. | |
| 8,919,053 B2 | 12/2014 | West | |
| 8,991,114 B2 | 3/2015 | West | |
| 9,106,023 B2 | 8/2015 | Schaefer et al. | |
| 9,689,411 B2 * | 6/2017 | Meine ...................... | F16B 2/12 |
| 2010/0147362 A1 | 6/2010 | King et al. | |

(Continued)

FOREIGN PATENT DOCUMENTS

WO 2016014042 A1 1/2016

*Primary Examiner* — Steven T Sawyer
*Assistant Examiner* — Sagar Shrestha
(74) *Attorney, Agent, or Firm* — Lance C. Venable; Law Office of Lance C. Venable, PLLC

(57) ABSTRACT

In various representative aspects, an assembly for connecting and electrically bonding electronic equipment to solar panel frames is provided. More specifically, the present invention relates generally to an assembly for securing and installing micro inverter and power optimizer units for use with solar panel arrays that are typically installed on roof structures. The assembly comprises a bracket assembly that couples micro invertors and power optimizers to solar panel frames.

14 Claims, 7 Drawing Sheets

(56) References Cited

U.S. PATENT DOCUMENTS

| | | | |
|---|---|---|---|
| 2011/0008125 A1* | 1/2011 | Moon | F16B 5/02 411/108 |
| 2012/0274264 A1* | 11/2012 | Mun | H01L 31/05 320/101 |
| 2014/0072387 A1* | 3/2014 | Strizki | F16B 33/004 411/371.1 |
| 2014/0202525 A1 | 7/2014 | Janssens et al. | |
| 2014/0263899 A1 | 9/2014 | Harris et al. | |
| 2015/0023727 A1* | 1/2015 | Williams | A47F 5/0031 403/188 |
| 2015/0129517 A1 | 5/2015 | Wildes | |
| 2015/0270802 A1 | 9/2015 | Schaefer et al. | |
| 2016/0020726 A1 | 1/2016 | Cavieres et al. | |
| 2016/0036141 A1* | 2/2016 | Lawson | H01R 11/12 439/784 |
| 2016/0111997 A1 | 4/2016 | Ganshaw et al. | |
| 2016/0118726 A1 | 4/2016 | Schaefer et al. | |
| 2016/0268965 A1* | 9/2016 | Stearns | H02S 40/32 |
| 2017/0207743 A1* | 7/2017 | Lemos | H02S 20/20 |

\* cited by examiner

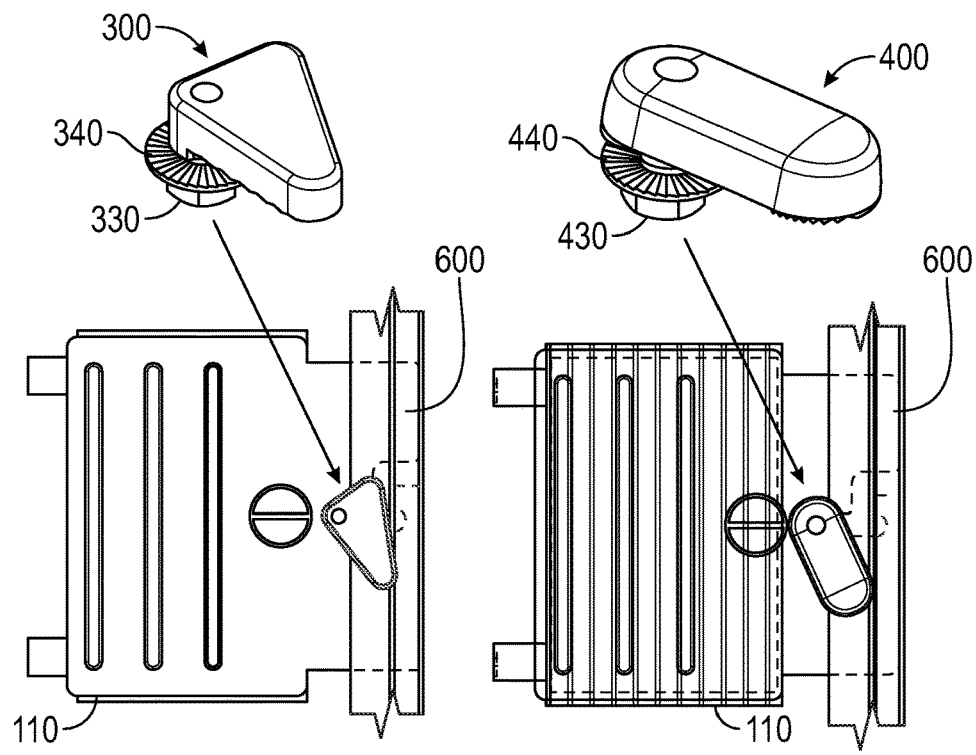
FIG. 9
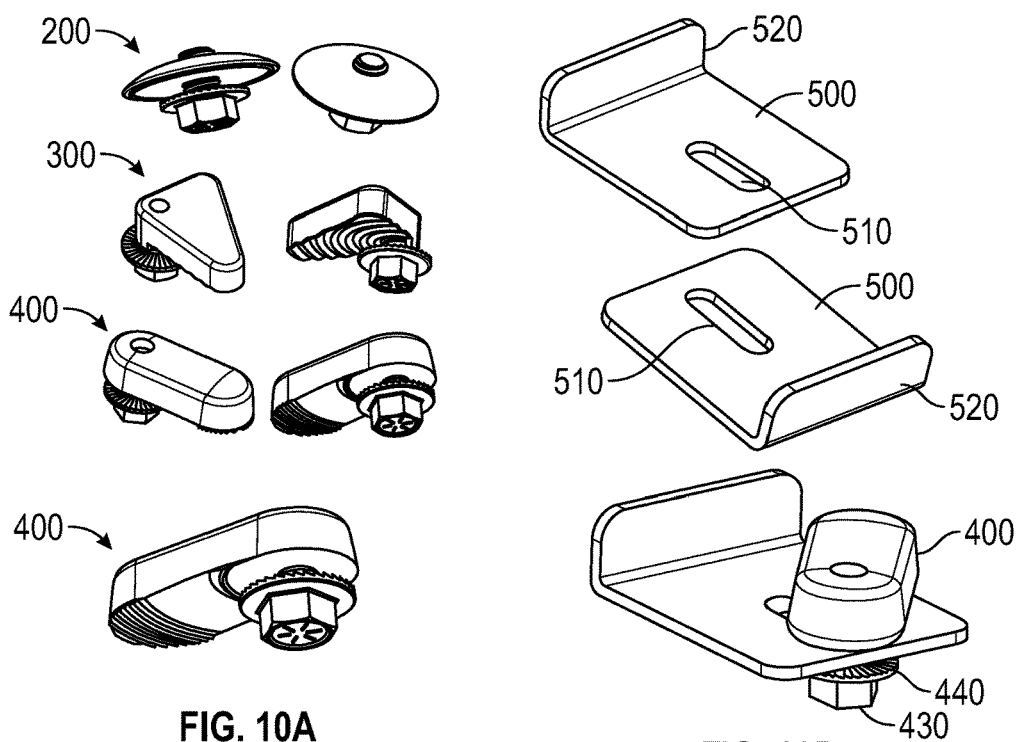
FIG. 10A  FIG. 10B

US 10,312,855 B2

1

BRACKET MOUNT FOR SECURING MICRO-INVERTERS AND POWER OPTIMIZERS TO SOLAR PANEL ARRAYS

BACKGROUND OF INVENTION

Field of the Invention

The present invention relates generally to an assembly for securing and installing electrical panels, and in particular, micro inverter and power optimizer units for use with solar panel arrays that are typically installed on roof structures. More specifically, the assembly comprises a bracket assembly that couples micro invertors and power optimizers to solar panel frames. When coupled to the solar panel frame, the bracket can also include an electrical bonding means to electrically bond the micro invertors and power optimizers to the solar panel frame. A method of installation is also disclosed.

Description of the Related Art

Any discussion of the prior art in the specification should in no way be considered as an admission that the prior art is widely known or forms part of common general knowledge in the field.

Installing a solar panel array on a roof can be challenging. One difficult aspect of the process is installing micro inventors and power optimizers as part of the array so that these devices have a low profile and require only a minimum number of parts to complete the installation. Micro-invertors and power optimizers are similar module-level electronic devices. A micro-invertor converts a solar panel's DC current to AC current. A power optimizer conditions a solar panel's DC current output before sending it to a central inverter.

There are several micro-invertors and power-optimizers on the market. A standard bracket used to mount either a micro-invertor or power optimizer typically includes one to three slots to accommodate fastening hardware. An example of a micro-inverter 135 is shown below in FIG. 2 and a power optimizer 100 in FIG. 1.

The power optimizer 100 includes a mounting plate 110 with a guide slot 140. The power optimizer unit 120 is secured to the mounting plate 110 and provides power to the solar panel array through cables 130.

There are two commonly known ways to install micro-invertors and power optimizers. The first is by mounting the apparatus to a rail structure like the micro-inverter 135 as shown in FIG. 2 that is bolted to the mounting rail 150 on the roof 155 by using the bolt 160, and the second is to secure the apparatus directly to a solar panel frame. The known prior art does not enable micro-inverters and power optimizers to be both secured directly to solar panel frames and electrically bond them to the solar panel array. The present invention overcomes these limitations and offers a solution that requires minimal parts and is easy to install, use, and manufacture

SUMMARY OF THE INVENTION

The invention is summarized below only for purposes of introducing embodiments of the invention. The ultimate scope of the invention is to be limited only to the claims that follow the specification.

2

It is an object of the present invention to provide a bracket mount assembly for securing electrical panels such as micro-inverters and power optimizers to a solar panel frame.

It is a further object of the present invention to provide a bracket mount assembly that electrically bonds the micro-inverter or power optimizer to the solar panel array.

It is a further object of the present invention for the bracket mount assembly to comprise a flange coupled to a bolt.

It is a further object of the present invention for the flange to comprise a threaded aperture that receives a threaded shaft on the bolt.

It is a further object of the present invention for the flange to comprise a raised portion for penetrating a surface oxidation layer on a solar panel frame.

It is a further object of the present invention for a head of the bolt to comprise at least one serration for penetrating a surface oxidation layer of a metal object such as a bracket.

It is a further object of the present invention for the flange to be in the shape of a circular disk, a triangle, or an elongated oval.

It is a further object of the present invention to provide a support bracket that is coupled between the flange and the bolt.

It is a further object of the present invention to provide a method for securing the power optimizer or the micro inverter to a solar panel frame.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 9 is an exploded top view of both a triangular-shaped mount and an elongated oval-shaped mount being used to secure a power optimizer to a solar panel frame.

FIGS. 10A and 10B illustrate perspective views of the various mounts and perspective views of an L-shaped bracket along with the elongated oval-shaped mount in combination with the L-shaped bracket.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
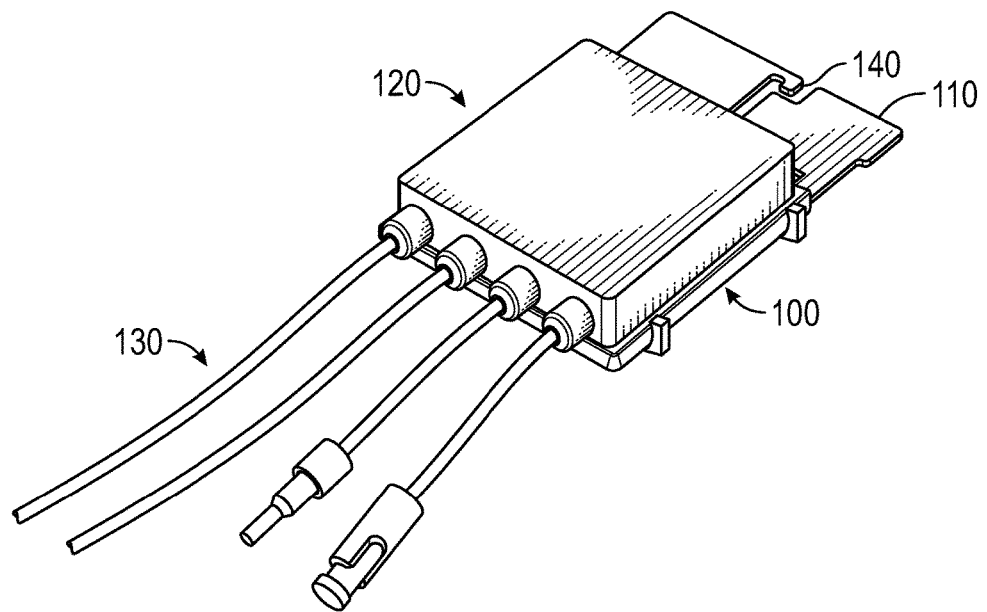
FIG. 1 illustrates a perspective view of a prior art power optimizer.
Figure 2:
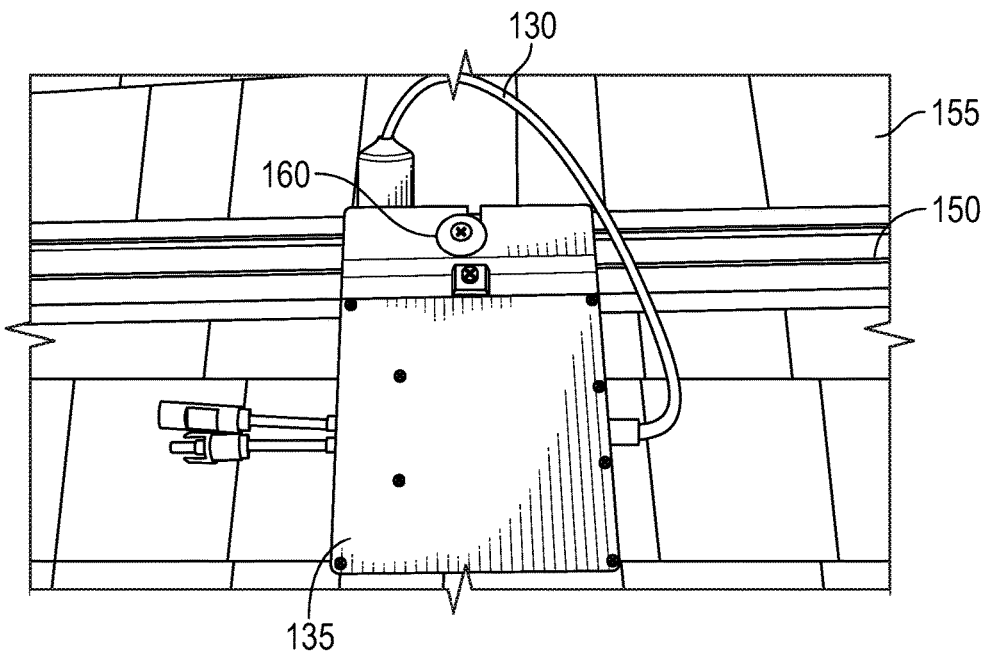
FIG. 2 illustrates a top view of a perspective view of a prior art micro-inverter secured to a solar panel mounting rail.

FIG. 1 shows a typical electrical panel as an exemplary power optimizer 100. As stated previously, a power optimizer conditions a solar panel's DC current output before sending it to a central inverter. The power optimizer 100 includes a cover 120 to shield the electronic components (not shown) inside the cover 120. A series of cables 130 interconnect with the electronics inside the cover 120. The electronic components and cover 120 are typically secured to a mounting bracket 110. The mounting bracket 110 in this embodiment has an opening such as a guided slit 140 for receiving the threaded portion of a bolt. As shown in FIG. 2, a typical solar panel array is secured to a roof 155 by securing each solar panel frame to a mounting rail 150. FIG. 2, an exemplary micro-inverter 135 that includes cables 130 connected to the electronics in the micro inverter. As stated previously, a micro-inverter converts a solar panel's DC current to AC current. In a typical solar panel array, both the power optimizer 100 and the micro-inverter 135 are secured to the mounting rail 150 by way of a standard nut and bolt 160 through the guided slit 140. The cables 130 can then be connected to the solar panel array.

Figure 3:
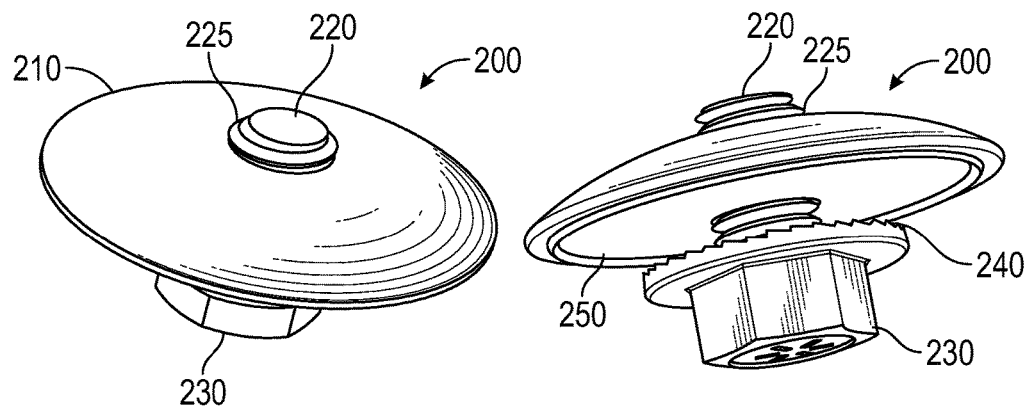
FIG. 3 is a top and bottom perspective view of an exemplary disk/circular-shaped micro-inverter and power optimizer mount.
Figure 4:
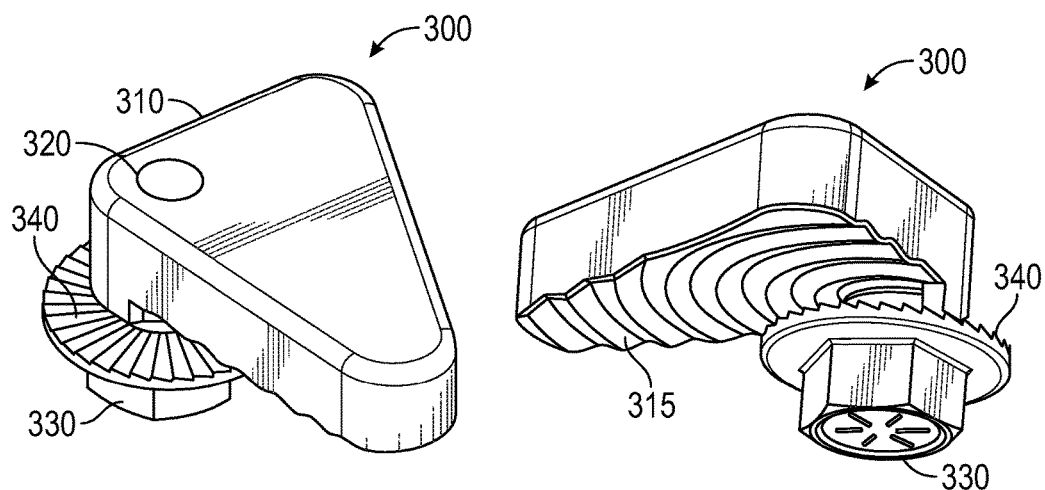
FIG. 4 illustrates a top and bottom perspective view of an exemplary triangular-shaped mount.
Figure 5:
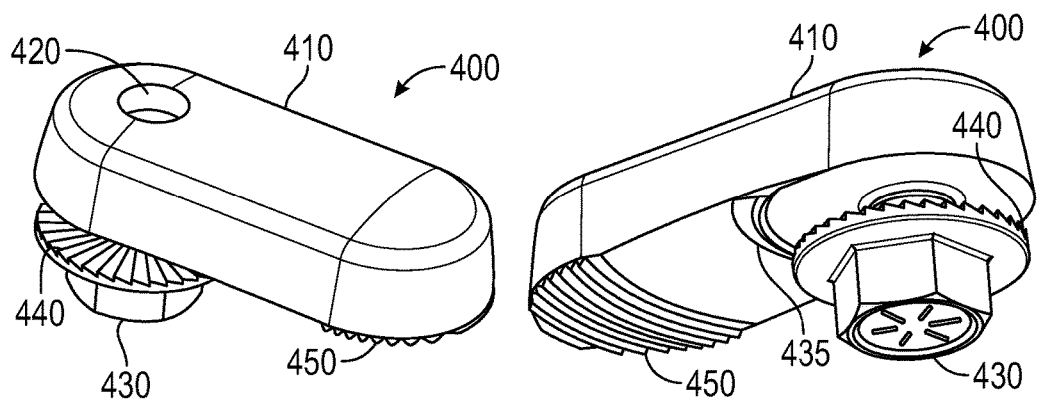
FIG. 5 illustrates a top and bottom perspective view of an exemplary elongated oval-shaped mount.

FIGS. 3-5 illustrate exemplary bracket mount assemblies for securing the power optimizers and micro-inverters to individual solar panel frames so that it is unnecessary to connect them to them to the mounting rails separately. FIG. 3 illustrates an exemplary disk or circular-shaped mount 200. The mount 200 includes a rounded head flange 210 with a threaded aperture 225 through its middle for receiving a threaded shank 220 of a bolt 230. The threaded aperture 225 typically extends from a top to a bottom surface of the flange 210. The bolt 230 includes a serrated portion 240 that is both used to help secure the micro-inverter or power optimizer to a solar panel frame and penetrate a surface oxidation layer of the mounting bracket 110 of the micro inverter or power optimizer. The rounded head flange also includes a raised portion such as a circular tooth 250 on the bottom side of the flange that, when tightened, can penetrate the surface oxidation layer of a metal object such as the solar panel frame or other metal bracket.

An alternate embodiment of the circular mount is the triangular-shaped mount 300 as shown in FIG. 4. The mount 300 includes a triangular-shaped head flange 310 with a threaded aperture 320 through one end for receiving a threaded portion of a bolt 330 and includes a serrated portion 340 that is used to help secure the micro-invertor or power optimizer to the solar panel frame and penetrate the surface oxidation layer of the mounting bracket 110 of the micro-invertor or power optimizer. The arcs 315 on the bottom surface of the triangular-shaped head flange 310 are raised portions that, when tightened, can penetrate the surface oxidation layer of a metal object such as the solar panel frame or other metal bracket.

Another alternate embodiment of the circular and triangular mounts is the elongated oval-shaped mount 400 as shown in a top and bottom perspective view in FIG. 5. The mount 400 includes an elongated oval-shaped head flange 410 with a threaded aperture 420 through one end of the flange 410 for receiving a bolt 430 and includes a serrated portion 440 that is used to help secure the micro-invertor or power optimizer to the solar panel frame and penetrate the surface oxidation layer of the mounting bracket 110 of the micro-invertor or power optimizer. The flange 410 also includes a raised portion such as the circular tooth 435 on the bottom side of the flange 410 on one end that, when tightened, is sufficiently sharp enough to penetrate the surface oxidation layer of a metal object such as the solar panel frame or other metal bracket. The flange 400 can also include a series of grips 450 on the end opposite the threaded aperture 420 to further assist in securing the mounting bracket 110 to the solar panel frame.

Figure 6:
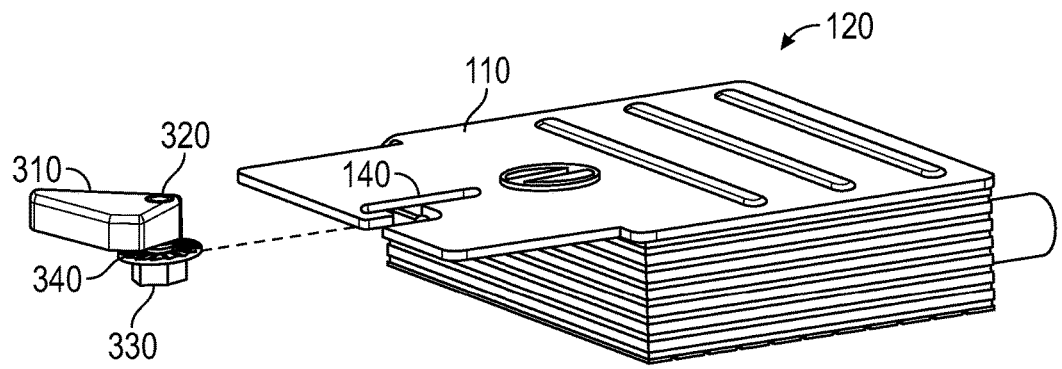
FIG. 6 is a perspective view illustrating a triangular-shaped mount with a power optimizer.
Figure 7:
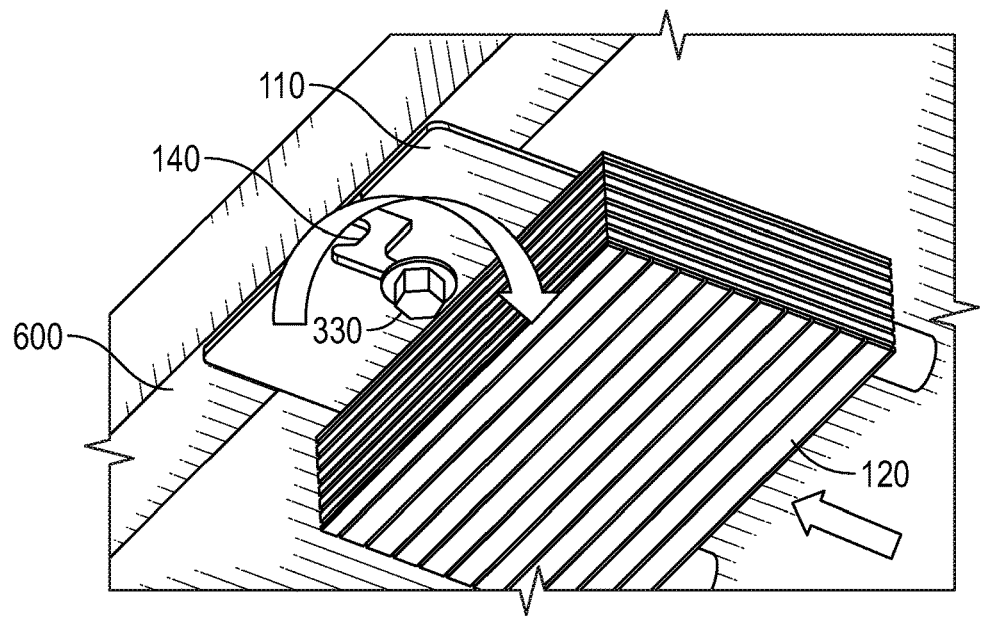
FIG. 7 illustrates a bottom perspective view a power optimizer being secured to a solar panel frame.

All three mount embodiments can be installed by using the following two-step process. The triangular-shaped mount 300 is used to illustrate the installation process. First, the threaded shaft 220 of the triangular-shaped mount 300 slides through the opening such as the guided slit 140 of the mounting bracket 110 of the micro-invertor or power optimizer as shown below in FIG. 6. The second step is to slide the mounting bracket 110 of the micro-invertor or power optimizer on to the lower lip 600 of the solar panel frame as shown below in FIG. 7, and then tighten the mount 300 by turning the bolt 330. As the bolt 330 is tightened, the serrated portion 340 penetrates the surface oxidation layer of the bracket 110 and the arcs 315 penetrate the surface oxidation layer of the solar panel frame 600. Likewise, if the circular-shaped mount 200 is used, when tightened, the serrated portion 240 will penetrate the surface oxidation layer of the mounting bracket 110 while the circular tooth 250 will penetrate the surface oxidation layer of the solar panel frame 600. Finally, if the elongated oval-shaped mount is used, the serrated portion 440 will penetrate the surface oxidation layer of the mounting bracket 110, while the circular tooth 435 will penetrate the surface oxidation layer of the solar panel frame 600. In all these cases, an electrical connecting path is then created between the bracket and the solar panel frame.

Figure 8:
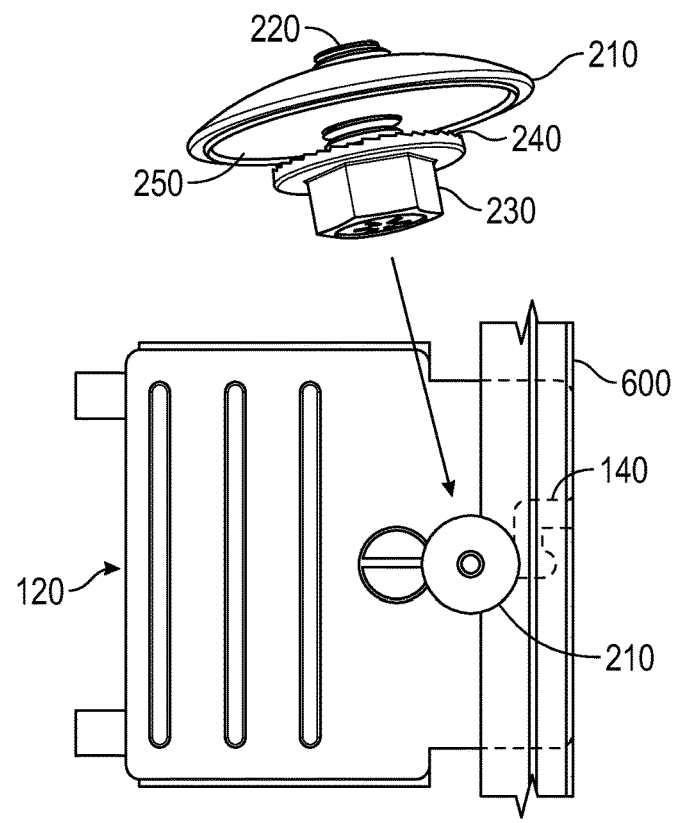
FIG. 8 is an exploded top view of a disk/circular-shaped mount being used to secure a power optimizer to a solar panel frame.

The circular mount 200 can be installed as shown in FIG. 8 by utilizing a non-orientation specific installation with the same steps provided above. The triangular and elongated oval-shaped mounts can be installed as shown in FIG. 9 by using an orientation-specific approach with the same steps as provided above. These two exemplary embodiments automatically adjust to the module leg length and will properly orientate themselves. This occurs because these mounts 300 and 400 will rotate until they encounter the inner module wall. At that time, the mount 300 or 400 stops rotating, but the bolt 330 or 430 keeps tightening and eventually the mount 300 or 400 is secure at proper torque and has clamped the assembly together.

FIG. 10B illustrates an alternate exemplary embodiment that comprises the use of a third element, namely a support bracket 500 used in combination with each of the mounts 200, 300, or 400. The support bracket 500 in this exemplary embodiment is an L-shaped support bracket and includes a perpendicular portion 520 and an open slot 510 that receives the bolts 230, 330, or 430 respectively in each of the mounts 200, 300, or 400. The use of the bracket 500 can provide additional structural capability to the mounts 200, 300, or 400 and works on virtually any shape of solar panel frame.

Figure 11:
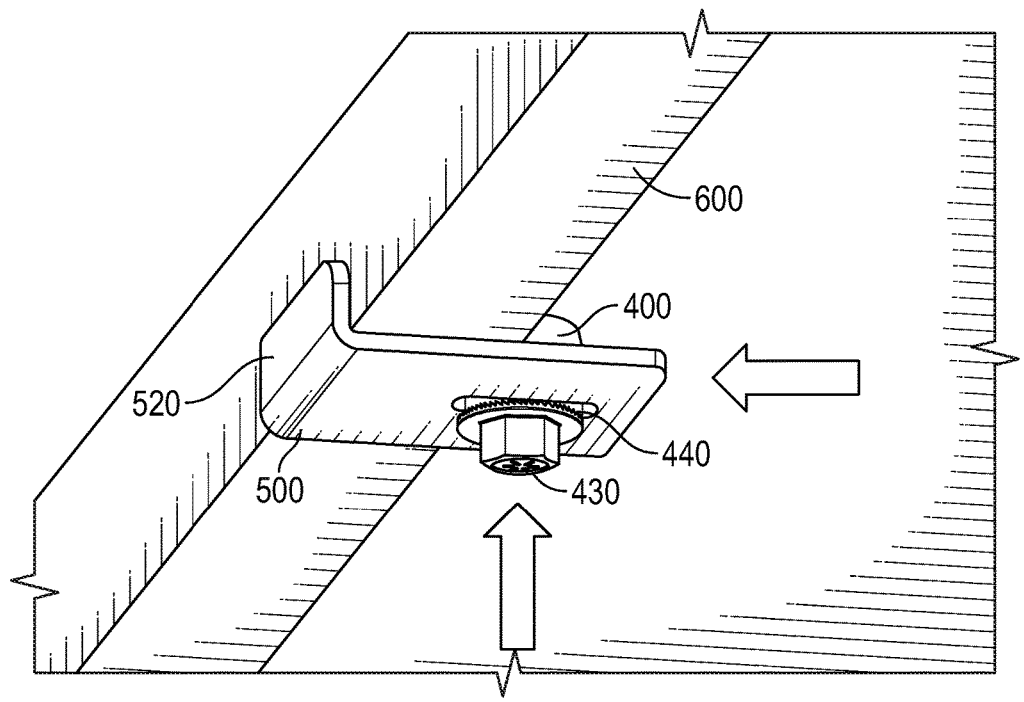
FIG. 11 illustrates a bottom perspective view of the L-shaped bracket secured to a solar panel frame with the elongated oval-shaped mount.

The mounts 200, 300, or 400 with the bracket 500 are installed in two steps. The first step involves assembling the mount 200, 300, or 400 on to the support bracket 500 as shown in FIG. 11 and then sliding the flange 210, 310, or 410 of the respective mount 200, 300, or 400 into place on the lip 600 of the solar panel frame as shown below in FIG. 11. The perpendicular portion 520 of the bracket 500 can optionally rest against the solar panel frame as shown.

Figure 12:
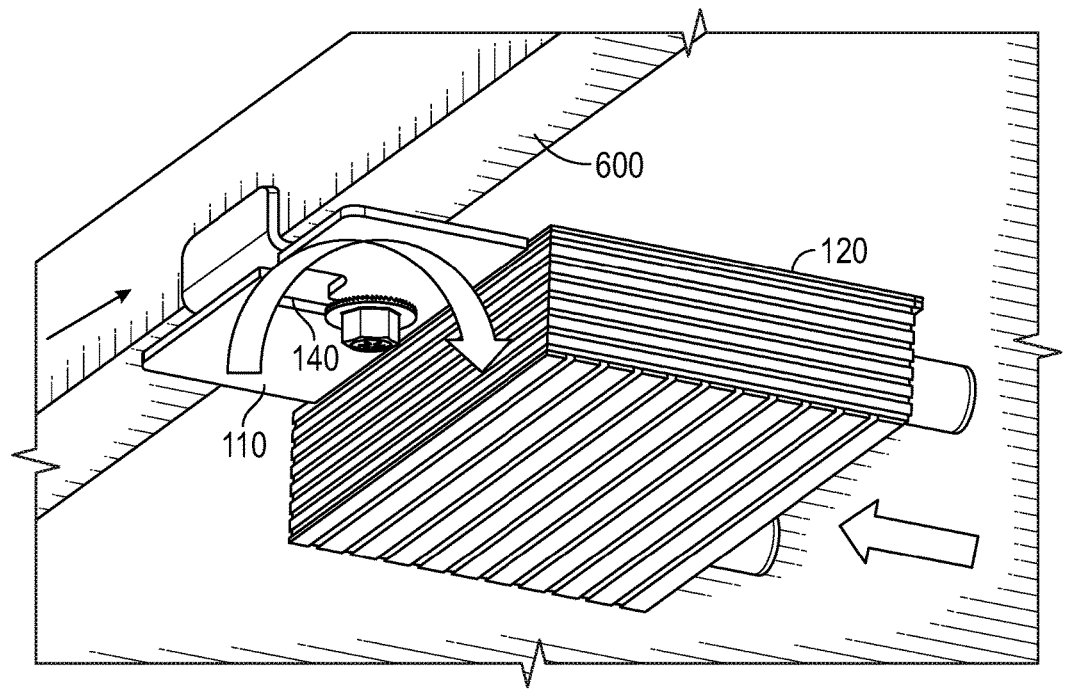
FIG. 12 illustrates a bottom perspective view of the power optimizer secured between the L-shaped bracket and the elongated oval-shaped mount.

The final step involves sliding the bracket 110 through the opening such as the guided slit 140 of the mounting bracket 110 of either the micro-inverter or the power optimizer into place on the support bracket 500 as shown in FIG. 12 and then tighten the mounts 200, 300, or 400 to the lower lip 600 of the solar panel frame by rotating the nut 230, 330, or 430 as shown. The support bracket 500 provides additional support to the bottom mounting bracket 110 and, fits most solar panel frame sizes.

Figure 13:
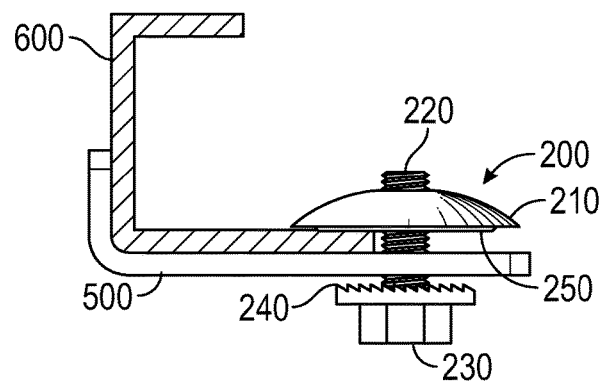
FIG. 13 illustrates a cross-sectional view of the L-shaped bracket secured to the solar panel frame using the disk/circular-shaped mount.
Figure 14:
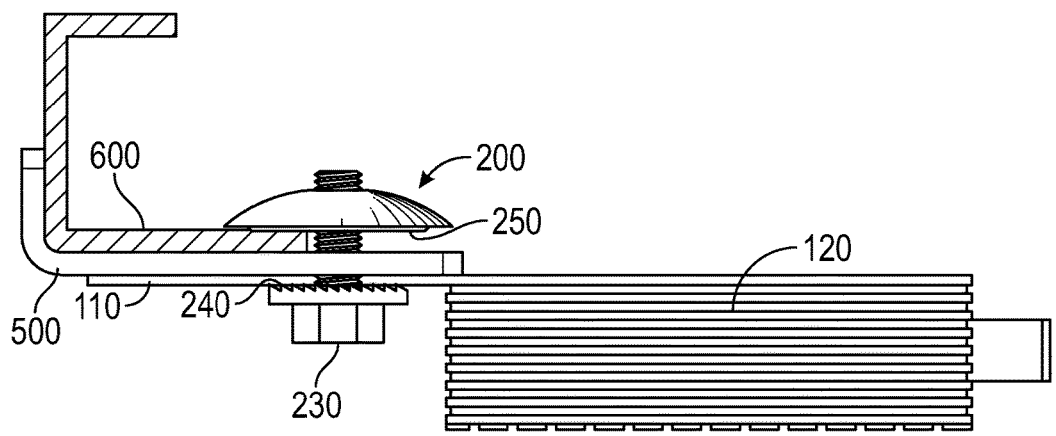
FIG. 14 illustrates a cross sectional view of FIG. 13 with the power optimizer installed between the L-shaped bracket and the disk/circular-shaped mount.

Using the circular mount 200 for example as shown in FIGS. 13 and 14, when tightened, the serrated portion 240, 340, or 440 will penetrate the surface oxidation layer of the mounting bracket 110 on the micro-inverter or the power optimizer, and the circular tooth 250 of the circular mount 200, the tooth 435 of the elongated oval-shaped mount 400, or the arcs 315 of the triangular-shaped mount 300 will penetrate the surface oxidation layer of the lip 600 of the solar panel frame and create an electrical connected path between the solar panel frame and the bracket 110.

What is claimed is:

1. A bracket mount assembly for securing and electrically coupling an electrical panel to a solar panel frame comprising:
   a) a flange, the flange comprising:
      i) a threaded aperture extending from a bottom surface to a top surface of the flange;
      ii) a raised portion disposed on the bottom surface around the threaded aperture for penetrating a surface oxidation layer on a first metal object;
      iii) a series of grips disposed on the bottom surface opposite to the threaded aperture, the series of grips shaped to grip the bracket mount assembly to the solar panel frame;
   b) a bolt, the bolt comprising:
      i) a head comprising at least one serration on a bottom surface of the head for penetrating a surface oxidation layer on a second metal object;
      ii) a threaded shaft that extends perpendicular from the bottom surface of the head and is coupled to the flange through the aperture; and
   c) an electrically conductive mounting bracket having an aperture for receiving the threaded shaft, the electrically conductive mounting bracket configured to couple the electrical panel.

2. The assembly of claim 1 further comprising the electrical panel, wherein the electrical panel is a power optimizer.

3. The assembly of claim 1 further comprising the electrical panel, wherein the electrical panel is a micro inverter.

4. The assembly of claim 1 wherein the flange is elongated oval-shaped.

5. A bracket mount assembly for securing and electrically coupling an electrical panel to a solar panel frame comprising:
   a) a flange, the flange comprising:
      i) a threaded aperture extending from a bottom surface to a top surface of the flange;
      ii) a raised portion disposed on the bottom surface around the threaded aperture for penetrating a surface oxidation layer on a first metal object;
      iii) a series of grips disposed on the bottom surface opposite to the threaded aperture, the series of grips shaped to grip the bracket mount assembly to the solar panel frame;
   b) a bolt, the bolt comprising:
      i) a head comprising at least one serration on a bottom surface of the head for penetrating a surface oxidation layer on a second metal object;
      ii) a threaded shaft that extends perpendicular from the bottom surface of the head and is coupled to the flange through the aperture;
   c) an electrically conductive mounting bracket having an aperture for receiving the threaded shaft, the electrically conductive mounting bracket configured to couple the electrical panel; and
   d) a support bracket, the support bracket further comprising:
      i) an opening for receiving the threaded shaft of the bolt such that the support bracket is positioned between the flange and the bolt.

6. The assembly of claim 5 further comprising the electrical panel, wherein the electrical panel is a power optimizer.

7. The assembly of claim 1 further comprising the electrical panel, wherein the electrical panel is a micro inverter.

8. The assembly of claim 5 wherein the flange is elongated oval-shaped.

9. The assembly of claim 5 wherein the support bracket is an L-shaped support bracket.

10. A method of securing and electrically coupling an electrical panel to a solar panel frame comprising the steps of:
   a) coupling an electrically conductive mounting bracket to a bracket mount assembly such that the bracket mount assembly comprises:
      i) a flange, the flange comprising;
         (1) a threaded aperture extending from a bottom surface to a top surface of the flange;
         (2) a raised portion disposed on the bottom surface around the threaded aperture;
         (3) a series of grips disposed on the bottom surface opposite to the threaded aperture, the series of grips shaped to grip the bracket mount assembly to the solar panel frame;
      ii) a bolt, the bolt comprising:
         (1) a head comprising at least one serration on a bottom surface of the head;

(2) a threaded shaft that extends perpendicular from the bottom surface of the head and is coupled to the flange through the aperture;

the electrically conductive mounting bracket is configured to couple the electrical panel;

b) clamping a lip of the solar panel frame between the bottom surface of the flange and a top surface of the electrically conductive bracket; and c) rotating the bolt until the electrically conductive mounting bracket is:
   i) secured to the lip of the solar panel frame;
   ii) the serration of the head penetrates a surface oxidation layer of the electrically conductive bracket; and
   iii) the raised portion penetrates a surface oxidation layer of the lip of the solar panel frame.

11. The method of claim 10 further comprising the step of coupling a support bracket between the lip of the solar panel frame and the head of the bolt.

12. The method of claim 10 wherein the aperture of the flange is positioned in the middle of the flange.

13. The method of claim 10 wherein the flange is elongated oval-shaped.

14. The method of claim 11 wherein the support bracket is an L-shaped support bracket.

* * * * *